July 6, 1926.  1,591,290

T. R. DAVIS

CAST METAL WHEEL

Filed Oct. 1, 1923   2 Sheets-Sheet 1

INVENTOR.
Thomas R. Davis
BY
Chamberlain & Newman
ATTORNEYS.

July 6, 1926.                                                                        1,591,290
                                T. R. DAVIS
                            CAST METAL WHEEL
                          Filed Oct. 1, 1923         2 Sheets-Sheet 2
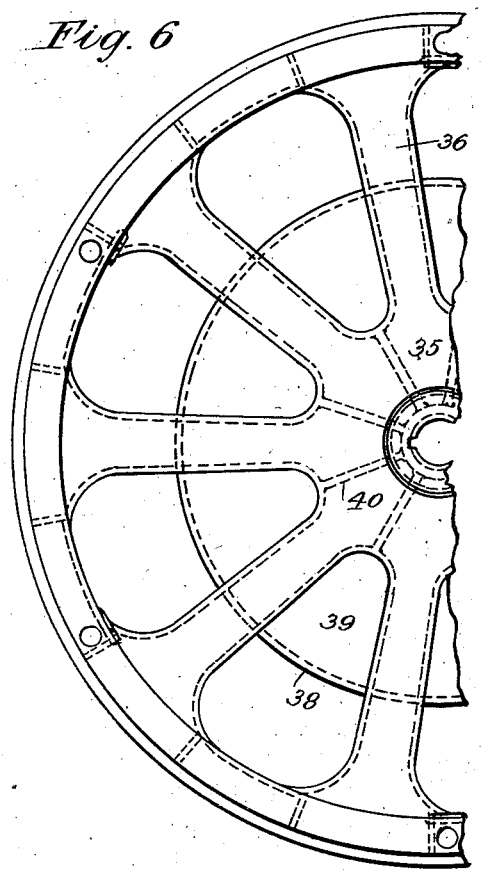
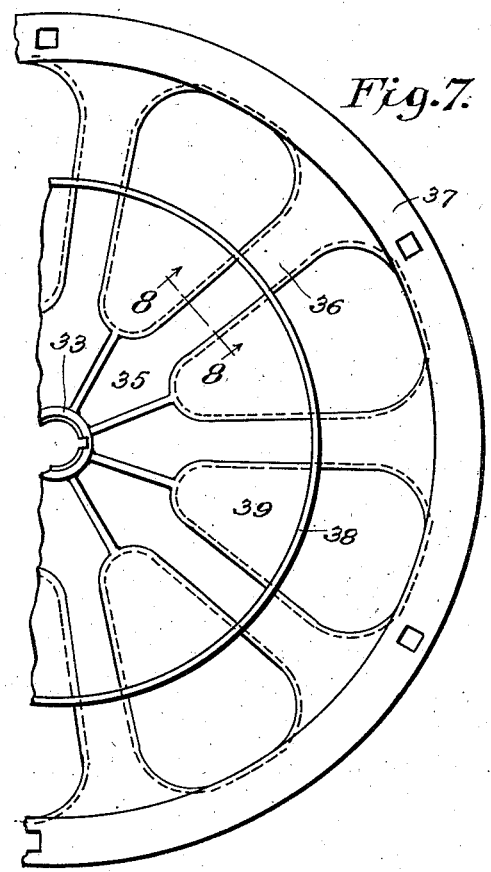
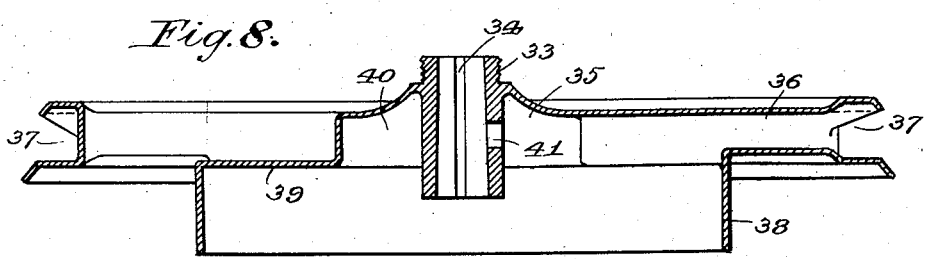
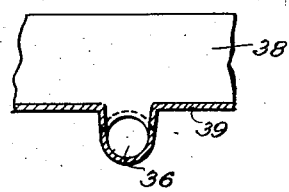
INVENTOR.
Thomas R. Davis
BY
Chamberlain & Newman
ATTORNEYS.

Patented July 6, 1926.

UNITED STATES PATENT OFFICE.

THOMAS R. DAVIS, OF FAIRFIELD, CONNECTICUT, ASSIGNOR TO THE EASTERN MALLEABLE IRON CO., OF BRIDGEPORT, CONNECTICUT, A CORPORATION OF CONNECTICUT.

CAST-METAL WHEEL.

Application filed October 1, 1923. Serial No. 665,779.

This invention relates to an improved wheel structure, and particularly an automobile wheel formed by casting, and having hollow spokes, an object being to provide a wheel of this character which will be of strong and reliable construction, and which may be produced economically and in large quantities.

A further object is to provide a one-piece wheel structure which lends itself to a molding process of production, and which is so designed that the core employed in connection with the molding operation may be supported and arranged in such manner that the metal of the walls of the wheel will be uniformly distributed and of equal thickness at each side. To this end the present embodiment is provided with a hub, having a series of openings in communication with the hollows of the spokes, and which in turn are in communication with the hollow of the rim, so that an integral one-piece core comprising the hub, the spokes and the rim may be employed.

A still further object is to provide an improved bearing structure, in which the bearing rings are accurately positioned and secured within the hub, and in which one of the rings will function to close the above mentioned openings in the hub.

With the above and other objects in view, embodiments of the invention are shown in the accompanying drawings, and these embodiments will be hereinafter more fully described with reference thereto, and the invention will be finally pointed out in the claims.

In the drawings:

Fig. 6 is a front plan view of one half of wheel according to the invention, and of modified type, being provided with an integral brake drum;

Fig. 7 is a rear plan view of the same;

Fig. 8 is a sectional view thereof; and

Fig. 9 is a detail sectional view, taken along the line 8—8 of Fig. 7.

Similar reference characters indicate corresponding parts throughout the several figures of the drawings.

Figure 1:
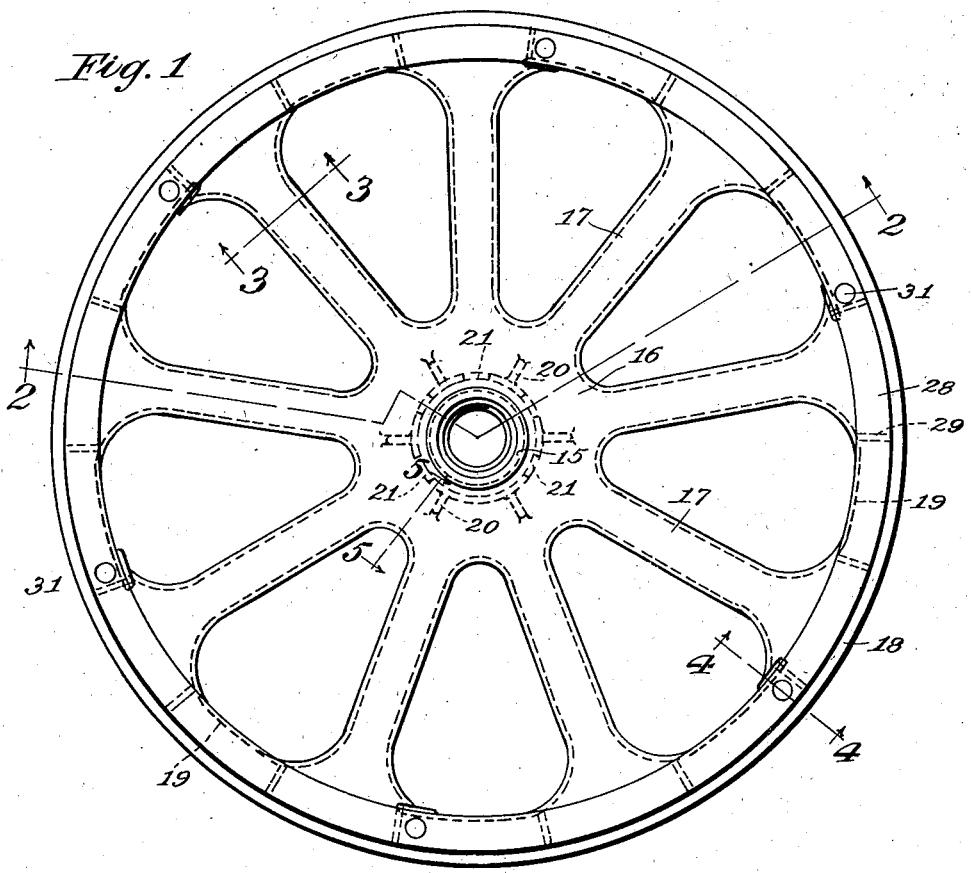
Fig. 1 is a plan view of a wheel according to one embodiment of the invention.
Figure 2:
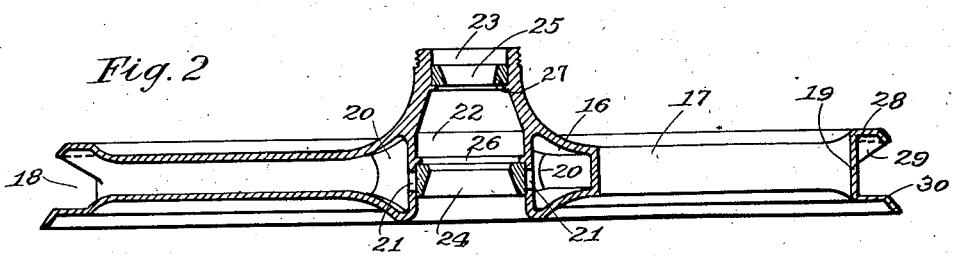
Fig. 2 is a sectional view thereof, taken along the line 2—2 of Fig. 1.
Figure 3:
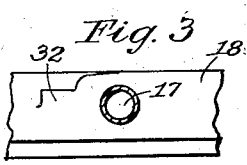
Fig. 3 is a detail sectional view through one of the spokes, and taken along the line 3—3 of Fig. 1.
Figure 4:
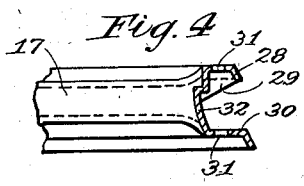
Fig. 4 is a detail sectional view of the rim portion, taken along the line 4—4 of Fig. 1.
Figure 5:
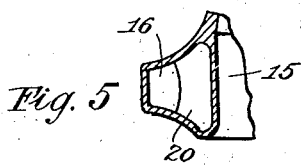
Fig. 5 is a detail sectional view of the hub portion, taken along the line 5—5 of Fig. 1.

Referring to the drawings, and more particularly to Figs. 1 to 5 thereof, the wheel according to one embodiment, consists of a hub 15 including a spindle receiving passage and an interior annular wall portion,— an annular hollow chamber 16 surrounding the annular wall portion, a series of hollow spokes 17 radiating from the chamber portion 16 and extending to the rim 18, said spokes being flared adjacent the rim, and the passage through each spoke opening into the rim, the flared portions of the spokes merging into the base portions 19 of the rim.

Reinforcing ribs 20 are provided in the annular portion 16 radially of the hub, and between these ribs the annular wall portion of the hub is provided with a series of holes 21, these being of smaller diameter than the hollows of the spokes. These holes are produced as a result of the casting process employed in the production of the wheel, and in which a one-piece core is provided comprising a hub core portion, a spoke core portion and a rim core portion, the hub portion being connected to the spoke portion by means of integral connection portions, these latter producing the holes. This improved process is shown and claimed in my copending application filed of even date herewith.

The hub is provided with a relatively large cylindical portion 22 adjacent its inner end, and a reduced portion 23 adjacent the projected outer end, and within these portions the bearing rings 24 and 25 are seated. The portions 22 and 23 are machined to proper size for fitting the bearing rings, and adjacent the thrust receiving ends of the rings annular lugs or shoulders 26 and 27 are provided to position and retain them.

The rim is provided with an outer flange 28 having an inwardly beveled edge and a series of reinforcing ribs 29 at its inner side, and an inner flange 30 having a beveled edge, said flange 30 being of larger diameter than the flange 28. Holes 31 are provided in the flanges for the tire retaining lug bolts, and adjacent these holes the rim is provided with lug abutting bosses 32.

The manner of forming the wheel with the one piece core referred to, provides a structure in which the walls of the wheel are of uniform thickness and free of any weak or thin portions. The wheel may be manufactured economically in large quantities, is of great strength, and sufficiently light in weight for automobile use.

In Figs. 6 to 9 there is illustrated a modified form of wheel, also adapted to be produced according to the improved method described in my copending application above referred to, this embodiment being provided with an integral brake drum. The hub 33 is provided with a key-slot 34, and is adapted in use to be keyed to the driven axle of an automobile. A hollow annular portion 35 surrounds the hub and the spokes 36 extend in radial relation therefrom to the rim 37, this rim being of similar construction to the rim structure of the first described form. The drum consists of a cylindrical band 38 spaced inwardly from the rim, and filler portions 39 extending between the band and the spokes, the hollows of the portion 35 and the spokes being open to the interior of the drum, so that the spokes are of U-shape cross-section within the drum, and are of circular cross-section between the drum and rim.

Reinforcing ribs 40 extend radially between the hub and the filler portions 39, and between these ribs the hub is provided with holes 41 through which the spoke core is connected to the hub core.

I have illustrated and described preferred and satisfactory embodiments of the invention, but it will be obvious that changes may be made therein, within the spirit and scope thereof, as defined in the appended claims.

Having thus described my invention, what I claim and desire to secure by Letters Patent is:

1. A one-piece cast wheel, comprising a hub, a hollow annular portion surrounding the hub, circumferentially spaced reinforcing ribs within said hollow portion extending outwardly from the hub, said hub having openings between said ribs in communication with the hollow of said hollow portion, hollow spokes in communication with the hollow of said hollow portion, and a rim having a series of spaced openings in its base constituting the open ends of said hollow spokes.

2. A one-piece cast wheel, comprising a hub, hollow spokes, and a rim having side flanges, said rim having a series of spaced openings in its base constituting the open ends of said hollow spokes, and reinforcing ribs extending between the base of said rim and one of said side flanges, said ribs being arranged at the sides of said openings.

3. A one-piece cast wheel, comprising a hub, hollow spokes, and a rim, said hub having openings in its wall in communication with said spokes, and a bearing ring inserted in said hub and adapted to cover said openings.

4. A one-piece cast wheel, comprising a hub, hollow spokes, and a rim, said hub having openings in its wall in communication with said spokes, an annular shoulder within said hub in inwardly spaced relation to said openings, and a bearing ring inserted in said hub in abutting relation to said ring and adapted to cover said openings.

5. A one-piece cast wheel, comprising a hub, hollow spokes, and a rim, said hub having openings in its wall in communication with said spokes, a machined bearing seat in said hub, and a bearing ring inserted in said seat and adapted to close said openings.

Signed this 28th day of September, A. D., 1923.

THOMAS R. DAVIS.